United States Patent [19]

Ito et al.

[11] Patent Number: 4,994,292
[45] Date of Patent: Feb. 19, 1991

[54] PROCESS FOR THE REMOVAL OF ISO-VALERIC ACID FROM VINEGAR

[75] Inventors: Isao Ito, Kashihara; Kazuo Uenakai, Osaka; Hiroki Matsuda, Nara; Masahiro Mizukami, Yamatokoriyama; Shinji Tanijiri, Osaka, all of Japan

[73] Assignee: Tamanoi Vinegar Co., Ltd., Osaka, Japan

[21] Appl. No.: 418,302

[22] Filed: Oct. 6, 1989

[51] Int. Cl.$^5$ ............................................. C12H 1/04
[52] U.S. Cl. .................................... 426/422; 210/660; 426/17; 426/271
[58] Field of Search .................... 426/422, 271, 17; 210/660

[56] References Cited

U.S. PATENT DOCUMENTS

| 4,156,026 | 5/1979 | Gogel | 426/271 |
| 4,205,092 | 5/1980 | Mattick et al. | 426/271 |
| 4,898,742 | 2/1990 | Shrikhande et al. | 426/271 |

FOREIGN PATENT DOCUMENTS

| 498539 | 12/1953 | Canada | 426/271 |
| 2632116 | 2/1977 | Fed. Rep. of Germany | 426/271 |
| 56-011431 | 3/1981 | Japan | 426/17 |
| 58-001914 | 1/1983 | Japan | 426/17 |
| 58-056663 | 4/1983 | Japan | 426/271 |
| 969713 | 11/1982 | U.S.S.R. | 426/17 |

Primary Examiner—Donald E. Czaja
Assistant Examiner—D. Workman
Attorney, Agent, or Firm—Armstrong, Nikaido, Marmelstein, Kubovcik & Murray

[57] ABSTRACT

Disclosed herein is a process for producing vinegar of favorable flavor exhibiting inherent flavor, taste and color derived from starting material, comprising the steps of bringing vinegar derived from fruits, etc. into contact with a non-ionic porous synthetic adsorbent, selectively adsorbing to remove iso-valeric acid contained in vinegar and reducing the concentration of iso-valeric acid to below 10 ppm, thereby effectively removing uncomfortable smelly ingredient, while leaving soluble nitrogen ingredient as the tasting or ingredient, organic acids providing mild sourness and color ingredients.

2 Claims, 1 Drawing Sheet

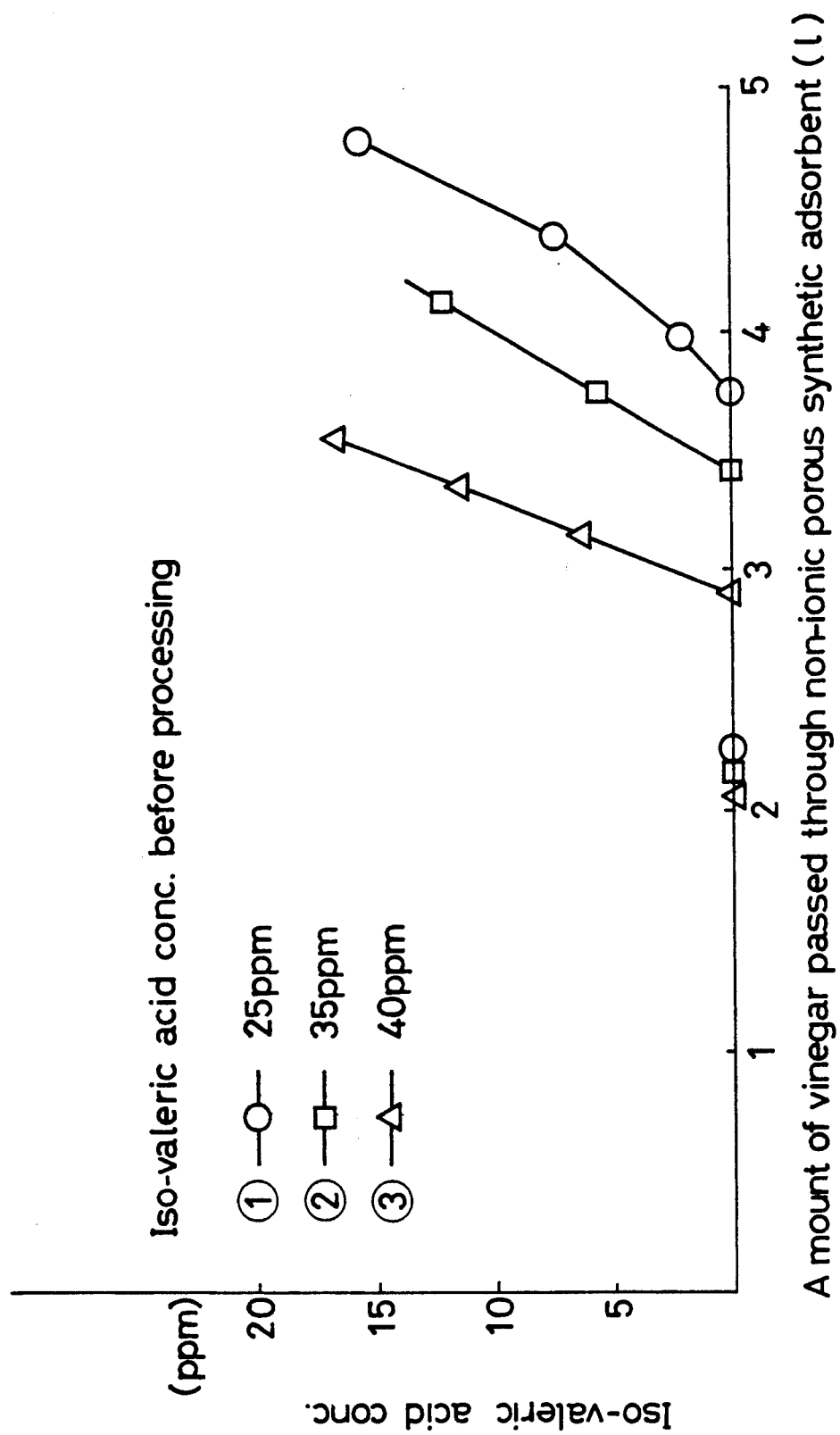

PROCESS FOR THE REMOVAL OF ISO-VALERIC ACID FROM VINEGAR

BACKGROUND OF THE INVENTION

1. Field of the Invention

A process for producing vinegar and, more in particular, it relates to a process for producing vinegar capable of selectively removing iso-valeric acid contained as a smelly component in vinegar thereby obtaining vinegar of favorable flavor by using a non-ionic porous synthetic absorbent.

2. Description of the Prior Art

Activated carbon has been utilized for controlling the flavor of vinegar and there has been employed a method of putting activated carbon into vinegar to be processed, stirring and then separating activated carbon by filtration. In addition, it has also been proposed a process of removing iso-valeric acid as a smelly component in vinegar by passing vinegar prepared from corn as starting material through an activated carbon layer having a thickness of not less than 1cm (refer to Japanese Patent Application No. 30776/1989).

By the way, non-ionic porous synthetic adsorbents have been utilized so far only to the separation and purification of physiologically active substance as described in, for example, Janpanese Patent Publication No. 17833/1979 (collecting and purifying process for cephalosporin C) or Japanese Patent Publication No. 6917/1982 (production process for an aqueous solution of adenosine triphosphate at high purity).

· Since vinegar used for processing foodstuffs has been used in a wide range for various foodstuffs, it has highly been demanded for removing those ingredients giving undesired effects on flavors of foodstuffs. Vinegar is prepared by alcohol fermentation and then acetic acid fermentation of cereals, fruits or sugars as starting materials and vinegar prepared in this way usually contains uncomfortable smelly components. Then, activated carbon has been used for removing iso-valeric acid as the uncomforatable smelly components.

However, the method of putting activated carbon in vinegar, stirring and then separate active carbon filtration requires a great amount of activated carbon. For instance, activated carbon as much as 25-30 g/l is required for reducing the content of iso-valeric acid in vinegar from 50 ppm to less than 10 ppm, which brings about problems, for example, increased production cost or extremely poor operation efficiency.

Further, vinegar starting from cereals, fruits or sugars has enriched favorable flavor or useful ingredients derived from the starting material. However, if the method of utilizing activated carbon is applied to vinegar, although iso-valeric acid as the uncomfortable nasty components can be removed, inherent flavors or colors derived from starting material such as fruits are removed together.

Further, since organic acids in vinegar are also removed, vinegar of strong sourness only composed of acetic acid is formed. After all, the method of using activated carbon involves a problem that inherent flavors, colors and taste derived from cereals, etc. as the starting material are lost to always produce only tasteless and odorless vinegar with no particular feature.

In a case if the treatment with activated carbon is applied to vinegar to such as extent as not reducing the flavor or color inherent to the starting material, iso-valeric acid remains by 10 ppm or more and the resultant vinegar shows uncomfortable malodor to give undesired effects or foodstuffs.

SUMMARY OF THE INVENTION

The object of the present invention is to overcome the foregoing problems and provide a process for producing vinegar capable of obtaining vinegar of favorable flavor by selectively removing only iso-valeric acid as uncomfortable smelly ingredient while containing useful ingredients of vinegar at they are.

The foregoing object of the present invention can be attained by a process for producing vinegar which comprises bringing vinegar derived from at least one of materials selected from the group consisting of cereals, fruits and sugars into contact with a non-ionic porous synthetic absorbent, thereby selectively adsorbing to remove iso-valeric acid containing in vinegar to less than 10 ppm of concentration.

The above and other objects, features and advantages of the present invention will be readily understood by the following detailed description in conjunction with the accompanying drawings.

dr

BRIEF DESCRIPTION OF THE DRAWINGS

FIG. 1 is a graph illustrating the change of the content of iso-valeric acid in vinagar treated by passing three kinds of corn vinegar of different iso-valeric acid concentrations respectively through a column packed with 100 ml of a non-ionic porous synthetic adsorbent.

DETAILED DESCRIPTION OF THE PREFERRED EMBODIMENTS

Vinegar usable in the present invention before treatment may be any of vinegars prepared starting from cereals, fruits or sugars and known generally as vinegar.

As such vinegar, there can be mentioned, for example, those prepared by subjecting cerals as the starting material to alcohol fermentation and then to acetic acid fermentation.

The non-ionic porous synthetic adsorbents usable in the present invention may be any of generally known synthetic adsorbents which are non-ionic and porous. As the non-ionic porous synthetic adsorbents, there can be mentioned, for example, SP-875, a cross-linked polystyrene manufactured by Mitsubishi Kasei Corporation, and Duolite S-861, a cross-linked polystyrene manufactured by SUMITOMO CHEMICAL COMPANY, LIMITED. The adsorbents may previously be treated with an aqueous solution of sodium hydroxide, etc, for increasing the activity.

Contact between vinegar and non-ionic porous synthetic adsorbent in the process according to the present invention is conducted, for example, by passing vinegar through a column packed with an absorbent. In this case, the flow rate of vinegar expressed by space velocity (S.V.), the ratio of the volume of the vinegar passed through the column for one hour to the volume of the adsorbent packed inside the column, is usually from 2 to 20. If the flow rate is lower than 2, excess processing time is required to lower the operation efficiency. On the other hand, if it exceeds 20, removing rate for iso-valeric acid is undesirably lowered. The flow rate is preferably from 5 to 10. The contact may be conducted at an atmospheric condition of normal temperature and normal pressure.

Then, intensity of uncomfortable malodor of iso-valeric acid depending on the concentration in vinegar has been studied and the results are shown in Table-1. In the evaluation, those giving no malodor are shown by "—" and giving malodor are shown by "+", in which the intensity is expressed by the number of "+".

TABLE 1

| Concentration of iso-valeric acid | 5 ppm | 10 ppm | 20 ppm | 40 ppm |
|---|---|---|---|---|
| Intensity of uncomfortable malodor | — | ± | + | +++ |

As apparent from the table, if the concentration of iso-valeric acid in vinegar exceeds 10 ppm, undesirable malodor is developed. Isoamyl alcohol formed with yeast upon alcohol fermentation in the course of vinegar brewery is a precursor for iso-valeric acid and isomamyl alcohol is oxidized by acetic acid fermentation to form iso-valeric acid. Accordingly, vinegar produced by way of alcohol fermentation and acetic acid fermentation starting from cereals, fruits or sugars generally contain from 20 to 140 ppm of iso-valeric acid although depending on the starting material and the fermentation conditions. Accordingly, it is necessary to remove a great amount of iso-valeric acid and reduce its content to 10 ppm or less in order to produce vinegar of favorable flavor.

Table-2 shows the results of measurement for iso-valeric acid and nitrogen content in vinegar before and after treatment with the non-ionic porous synthetic adsorbent, as well as removing rate thereof.

TABLE 2

| | Before treatment | | After treatment | | Removing rate (%) | |
|---|---|---|---|---|---|---|
| Sample | Iso-valeric acid (ppm) | Total nitrogen (mg/100 ml) | Iso-valeric acid (ppm) | Total nitrogen (mg/100 ml) | Iso-valeric acid | Total nitrogen |
| ① | 25 | 71.3 | 0 | 67.3 | 100 | 5.6 |
| ② | 35 | 26.9 | 0 | 24.0 | 100 | 10.8 |
| ③ | 40 | 13.6 | 0 | 11.9 | 100 | 12.5 |

The amount of vinegar processed was 3 liter as expressed by the amount of vinegar passing through the synthetic adsorbent.

From the results, it has at first been confirmed that iso-valeric acid is removed by 100% up to the processing amount of vinegar of about 3–3.8 liter.

Further, it has been confirmed that the processing amount by the non-ionic porous synthetic adsorbent depends on the content of iso-valeric acid in vinegar, that is, the processing amount is increased more in vinegar of lower iso-valeric acid concentration, while other ingredient such as nitrogen content has no substantial effect on the processing amount. Accordingly, it has been confirmed that iso-valeric acid can be removed efficiently of vinegar of extremely high nitrogen content such as brown rice vinegar is processed with the non-ionic porous synthetic adsorbent with not effect of the nitrogen ingredient.

Comparison had been made for iso-valeric acid and other ingredients between the process according to the present invention and the conventional method (using activated carbon) applied to rice vinegar and apple vinegar. Results are shown in Tables 3 and 4 respectively.

TABLE 3

| Rice Vinegar (concentration of acetic acid: 10%) | | | |
|---|---|---|---|
| | Before treatment | This invention | Conventional |
| Iso-valeric acid (ppm) | 73.7 | 0 | 1 |
| Total nitrogen (mg/100 ml) | 58.8 | 53.3 | 33.5 |
| Color (OD470) | 0.082 | 0.020 | 0 |
| Succinic acid (mg/100 ml) | 98.5 | 97.0 | 9.1 |
| Tartaric acid (mg/100 ml) | 182.0 | 180.5 | 166.8 |
| Citric acid (mg/100 ml) | 58.2 | 58.0 | 49.6 |

TABLE 4

| Apple vinegar (concentration of acetic acid: 5%) | | | |
|---|---|---|---|
| | Before treatment | This invention | Conventional |
| Iso-valeric acid (ppm) | 135.2 | 0 | 0 |
| Total nitrogen (mg/100 ml) | 5.6 | 4.9 | 2.7 |
| Color (OD470) | 0.382 | 0.252 | 0 |
| Succinic acid (mg/100 ml) | 106.9 | 106.1 | 35.6 |
| Tartaric acid (mg/100 ml) | 48.8 | 44.9 | 42.4 |
| Citric acid (mg/100 ml) | 55.6 | 54.4 | 21.3 |
| Malic acid (mg/100 ml) | 73.6 | 73.0 | 49.7 |
| Lactic acid (mg/100 ml) | 124.8 | 124.3 | 107.9 |

As has been described above, only iso-valeric acid can be completely removed selectively by the process according to the present invention both for rice vinegar and apple vinegar, while the removing rate of nitrogen ingredient and organic acid is restricted to extremely low extent. With respect to color, the color removal rate is 30% for apple vinegar and 70% for rice vinegar and it has been confirmed that colors derived from the starting materials remain without being removed completely.

On the other hand, in the conventional method, color is also removed completely together with the removal of iso-valeric acid to form colorless vinegar with no particular feature. In addition, nitrogen component is removed by about 50% and a great amount of organic acids is also removed.

Therefore, according to the process of the present invention, vinegar retain a great amount of soluble nitrogen components which are important as the tasting ingredients, organic acids making sourness mild and colors derived from starting material, only iso-valeric acid as uncomfortable smelly ingredient being removed, to obtain vinegar of favorable flavor.

Sensual test was conducted for the flavor of vinegar before and after treatment by the process according to the present invention and the conventional process. The results are shown in Table-5.

The results are shown by average scores such as: 1: extremely poor, 2: poor, 3: ordinary, 4: good, 5: extremely good.

TABLE 5

|  | Before treatment | Conventional | This invention |
|---|---|---|---|
| Apple vinegar | 1.3 | 3.8 | 4.5 |
| Rice vinegar | 1.2 | 3.9 | 4.4 |

According to the conventional process, although the evaluation was imporved in that malodor is removed, mild taste is lost and coloring ingredients are removed completely. Accordingly, it shows lower evaluation, as compared with the process according to the present invention the vinegar, with no particular feature like that alcohol vinegar is formed although vinegar is started from apple or rice.

EMBODIMENT

Example 1

To a column previously packed with 100 ml of non-ionic porous synthetic adsorbent SP-875 (manufactured by Mitsubishi Kasei Corporation) activated with an aqueous 0.2% solution of NaOH, vinegar prepared from corn as the starting material having a concentration of acetic acid of 10% and containing 40 ppm of iso-valeric acid was passed through at a flow rate of 10. Passing of liquid was interrupted when the concentration of iso-valeric acid in vinegar after passing was reduced to 10 ppm. 3.5 liter of vinegar thus obtained was free from malodor and of favorable flavor.

Example 2

To a column previously packed with 120 ml of non-ionic porous synthetic adsorbent Duolite S-861 (manufactured by SUMITOMO CHEMICAL COMPANY, LIMITED) activated with an aqueous 0.5% solution of NaOH, 1.5 liter of vinegar prepared from rice as the starting material having a concentration of acetic acid of 10% and containing 74 ppm of iso-valeric acid was passed through at a flow rate of 5. The concentration of iso-valeric acid in the resultant vinegar was 0 ppm and the vinegar was free from malodor and of favorable flavor.

Example 3

To a column previously packed with 120 ml of non-ionic porous synthetic adsorbent SP-875 (manufactured by Mitsubishi Kasei Corporation) activated with an aqueous 0.2% solution of NaOH, 1.5 liter of vinegar prepared from apple juice as the starting material and having a concentration of acetic acid of 5% and containing 135 ppm of iso-valeric acid was passed through at a flow rate of 5. The resultant vinegar was quite free from iso-valeric acid and of favorable flavor exhibiting similar color and perfume as those in apple juice.

Example 4

To a column previously packed with 100 ml of non-ionic porous synthetic adsorbent SP-875 (manufactured by Mitsubishi Kasei Corporation) activated with an aqueous 0.5% solution of NaOH, vinegar prepared by using corn syrup (D.E. 40) as the starting material by alcohol fermentation and then acetic acid formentation, acetic acid of 10% and iso-valeric acid concentration of 40 ppm passed through.

When the liquid passage was interrupted at an instance the concentration of iso-valeric acid in the vinegar after passing was reduced to 5 ppm, 3.2 liter of vinegar without free from molodor and favorable flavor could be obtained.

When vinegar is produced starting from cereals and fruits or sugars by the process according to the present invention, uncomfortable smelly ingredients can be removed effectively while leaving soluble nitrogen ingredients as tasting ingredient, organic acids providing mild sourness and color ingredients to obtain vinegar of favorable flavor exhibiting inherent flavor, taste and color derived from the starting material.

Having described illustrative embodiments of the invention with reference to the accompanying drawing, it is to be understood that the invention is not limited to such precise embodiments, and that various changes and modifications may be effected therein by one skilled in the art without departing from the scope and the sprit of the invention as defined in the appended claim.

What is claimed is:

1. A process for the purification of vinegar which comprises contacting vinegar containing iso-valeric acid with a porous, non-ionic cross-linked polystyrene adsorbent to selectively removed iso-valeric acid from the vinegar.

2. A process according to claim 1, wherein the purified vinegar contains less than 10 ppm of iso-valeric acid.

* * * * *